United States Patent Office 2,778,816
Patented Jan. 22, 1957

2,778,816

COBALTIFEROUS AND CHROMIFEROUS AZO-DYESTUFFS

Arthur Buehler, Rheinfelden, and Christian Zickendraht, Binningen, Switzerland, assignors to Ciba Limited, Basel, Switzerland, a Swiss firm No Drawing. Application August 15, 1952,
Serial No. 304,629

Claims priority, application Switzerland August 17, 1951

11 Claims. (Cl. 260—151)

According to this invention valuable new cobaltiferous and chromiferous azo-dyestuffs are made by treating a monoazo-dyestuff free from sulfonic acid and carboxylic acid groups and corresponding to the general formula (1)

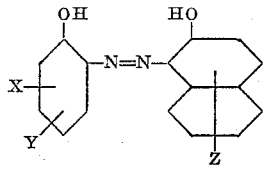

in which X represents hydrogen or a nitro, alkyl or acylamino group or a halogen atom, Y represents a sulfonic acid amide group, and Z represents an alkyl, alkoxy or sulfonic acid ester group or a halogen or hydrogen atom, and in which when Y represents an unsubstituted sulfonic acid amide group, at most one of the symbols X and Z represents hydrogen, with an agent yielding chromium or advantageously an agent yielding cobalt in such manner that the resulting chromiferous or cobaltiferous dyestuff contains less than one atom of chromium or cobalt in complex union per molecule of monoazo-dyestuff.

The monoazo-dyestuffs corresponding to the above formula and serving as starting materials in the present process contain only once the grouping —SO₂N< that is to say that they contain a single sulfonic acid amide group which, even if it is substituted, contains only one nitrogen atom; these starting monoazo dyestuffs can be made by coupling a diazo compound of an amine of the formula

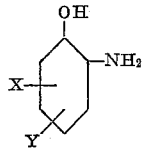

with a coupling component of the formula

in which the symbols X, Y and Z have the meanings given above, and by so choosing the starting materials that Y is a substituted sulfonic acid amide group or that at most one of the symbols X and Z represent hydrogen. There may be used ortho-hydroxy-diazo-benzene sulfonic acid amides which do not contain substituents in the benzene nucleus nor in the sulfonic acid amide radical, and such as contain in the benzene nucleus a substituted sulfonic acid amide group advantageously one of the formula SO₂NHC$_n$H$_{2n+1}$ wherein $n$ is a whole number up to 4, or alkyl groups (for example, methyl), a nitro group, an acylamino group (for example, acetylamino) or advantageously a halogen atom (for example, chlorine). As examples of suitable starting materials there may be mentioned the diazo compounds of the following ortho-hydroxy-amines:

(a) Ortho-hydroxy-amino-benzene sulfonic acid amides containing substituents in the benzene nucleus and/or in the sulfonic acid amide group, such as 4-nitro- or 4-chloro-2-amino - 1 - hydroxybenzene - 6 - sulfonic acid amide, 6-chloro- or 6-nitro-2-amino-1-hydroxybenzene-4-sulfonic acid amide, 4-methyl- or 4-chloro-2-amino-1-hydroxybenzene-5-sulfonic acid amide, 6-nitro- or 6-chloro-2-amino-1-hydroxybenzene-4-sulfonic acid-N-methylamide, 4-nitro-2-amino-1-hydroxybenzene-6-sulfonic acid-N-methylamide or N-phenylamide and especially 2-amino-1-hydroxybenzene-4-sulfonic acid-N-methylamide, -N-ethylamide, -N-isopropylamide, -N-butylamide, -N-β-hydroxyethylamide, -N-β-methoxy-ethylamide, -N-β-chlorethylamide, -N-dimethylamide, -N-diethylamide or -N-di(hydroxyethyl)-amide, 2-amino-1-hydroxybenzene-4-sulfonic acid-N-cyclohexylamide, 2-amino-1-hydroxybenzene-4-sulfonic acid-N-phenylamide or -N-para-chlorophenylamide, 2-amino-1-hydroxybenzene-4-sulfonic acid-N-methylphenylamide or -N-ethylphenylamide, 2-amino-1-hydroxybenzene-4-sulfonic acid pyrrolidide and the corresponding 2-amino-1-hydroxybenzene-5-sulfonic acid amides.

(b) Ortho-hydroxyaminobenzene sulfonic acid amides containing no further substituents (either in the benzene nucleus or in the sulfonic acid amide group) such as 2-amino-1-hydroxybenzene-4- or -5-sulfonic acid amide.

For the preparation of the monoazo-dyestuffs there are used as coupling components, on the one hand, β-naphthol which is coupled only with a diazo compound of the kind mentioned under (a), and on the other, 2-hydroxy-naphthalenes which contain an alkyl or alkoxy group, advantageously containing only a few carbon atoms, a halogen atom (for example bromine) or a sulfonic acid aryl ester group (for example, a sulfonic acid phenyl ester or para-tolyl ester group). As examples there may be mentioned 6-bromo-, 6-chloro- or 6-methoxy-2-hydroxynaphthalene, 6-methyl-2-hydroxynaphthalene, 6-n-butyl-2-hydroxynaphthalene or 2-hydroxynaphthalene-4- or -5- or -6- or -7-sulfonic acid phenyl ester, 2-hydroxynaphthalene-6- or -7-para-tolyl ester. These substituted 2-hydroxynaphthalenes may be coupled either with the diazo compounds mentioned under (a) or advantageously with those mentioned under (b).

Coupling can be carried out by the usual known methods, advantageously in an alkaline medium, for example, a medium rendered alkaline with an alkali carbonate and/or an alkali hydroxide.

When the coupling reaction is complete, the dyestuffs, for the purpose of metallization, can be separated from the coupling mixture easily by filtration, since they are only slightly soluble in water. They are advantageously used for metallization in the form of filter cakes without intermediate drying. In some cases it is also possible to carry out the metallization directly in the coupling mixture without any intermediate separation.

The monoazo-dyestuffs serving as starting materials for the present process, and obtainable as described above, are in part new. In general they are also not very easily soluble in water even in the form of their alkali compounds. However, some of them are sufficiently soluble in that form to dye well from dyebaths requiring no addition of acid, for example, in the single bath chroming process.

The treatment with an agent yielding chromium or cobalt is carried out in the present invention in such manner that a chromiferous or cobaltiferous dyestuff is obtained which contains less than one atom of chromium or cobalt in complex union per molecule of monoazo dyestuff. Accordingly, the metallization is advantageously carried out with such agents containing chromium or cobalt and by such methods as lead to complex chromium or cobalt compounds having the aforesaid constitution. In general, it is desirable to use less than one atomic proportion of chromium or cobalt for each molecular proportion of monoazo dyestuff and/or to carry out the metallization in a weakly acid to alkaline medium. Accordingly, chromium or cobalt compounds which are stable towards alkaline media are especially suitable for carrying out the process, for example chromium or cobalt compounds of aliphatic hydroxy-carboxylic acids or dicarboxylic acids or advantageously chromium compounds of aromatic ortho-hydroxy-carboxylic acids, which contain the chromium or cobalt in complex union. As examples of aliphatic hydroxy-carboxylic acids or dicarboxylic acids there may be mentioned among others lactic acid, oxalic acid, glycollic acid, citric acid and especially tartaric acid, and among the aromatic ortho-hydroxy-carboxylic acids there may be mentioned, for example, those of the benzene series such as 4- or 5- or 6-methyl-1-hydroxybenzene-2-carboxylic acid and above all 1-hydroxybenzene-2-carboxylic acid itself. However, as agents yielding cobalt there are also suitable simple compounds of divalent cobalt such as cobalt acetate or cobalt sulfate, or, if desired, cobalt hydroxide. With these simple cobalt compounds the desired 1:2-complexes are also obtained when the metallization is carried out in a neutral or alkaline medium.

The conversion of the dyestuffs into the complex chromium or cobalt compounds is advantageously carried out at a raised temperature, under atmospheric or superatmospheric pressure, for example, at the boiling temperature of the reaction mixture, if desired, in the presence of suitable additions, for example, salts of organic acids, bases, organic solvents or other agents assisting the formation of complexes.

Especially valuable are the cobalt complexes so obtained.

In a special form of the process there is used as starting material a mixture of different metallizable monoazo-dyestuffs, which are free from sulfonic acid and carboxylic acid groups and are of the benzene-azo-naphthalene series, and of which at least one corresponds to the general Formula 1 given above. Obviously, the treatment with an agent yielding chromium or cobalt must be carried out in such manner that chromiferous or cobaltiferous dyestuffs are obtained which contain less than one atom of chromium or cobalt in complex union per molecule of dyestuff. Valuable products of this kind are, for example, those in which each atom of chromium or cobalt is bound in complex union to one molecule of each of two different monoazo dyestuffs which are both free from sulfonic acid and carboxylic acid groups and of which dyestuffs one corresponds to the above Formula 1 and the other corresponds to the formula

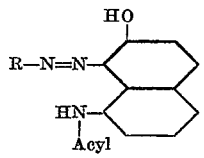

or the formula

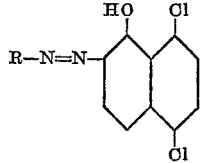

in which R represents a radical of the benzene series bound to the azo linkage in ortho-position relatively to a hydroxyl group.

The ortho:ortho'-dihydroxymonoazo-dyestuffs of the benzene-azo-naphthalene series, which are used in the form of the process last mentioned above, can be made by coupling an ortho-hydroxy-diazo-compound of the benzene series with an hydroxynaphthalene capable of coupling in a position vicinal to a hydroxyl group. As examples of ortho-hydroxydiazo-compounds of the benzene series, there may be mentioned those obtainable from the following amines: 6-acetylamino-4-nitro-2-amino-1-hydroxybenzene, 4-nitro- or -5- nitro-2-amino-1-hydroxybenzene, 4:6-dinitro- or 4:6-dichloro-2-amino-1-hydroxybenzene, 4-nitro-6-chloro-2-amino-1-hydroxybenzene, 6-nitro-4-acetylamino-2-amino-1-hydroxybenzene, 2-amino-1-hydroxybenzene-4-methyl sulfone and the 2-amino-1-hydroxybenzene sulfonic acid amides mentioned above. As hydroxynaphthalenes there come into consideration α- and β-naphthols, for example, 5-chloro-1-hydroxynaphthalene, 2-hydroxynaphthalene, 6-methoxy- or -6-bromo-2-hydroxynaphthalene, and advantageously 1-acetylamino-, 1-n-butyrylamino- or 1-benzoylamino-7-hydroxynaphthalene and above all 5:8-dichloro-1-hydroxynaphthalene.

In this form of the process also the treatment with the agent yielding metal is, of course, carried out in such manner that the resulting metalliferous dyestuff contains less than one atom of metal in complex union per molecule of monoazo-dyestuff.

In another form of the process a mixture of agents yielding metal, for example, a mixture of an agent yielding cobalt and an agent yielding chromium, is used.

The dyestuffs obtainable by the present invention, especially the chromiferous dyestuffs, can also be made by a somewhat more complicated process in which a chromium compound of a monoazo-dyestuff free from sulfonic acid and carboxylic acid groups and containing one atom of chromium in complex union per molecule of dyestuff (a 1:1-complex) is reacted with a metal-free ortho:ortho'-dihydroxy-monoazo-dyestuff free from sulfonic acid and carboxylic acid groups, and in which a metal-free and a chromiferous monoazo-dyestuff are used, both of which are of the benzene-azo-naphthalene type and of which at least one corresponds to the general Formula 1.

In this modification of the process the starting materials may be so chosen that either the monoazo-dyestuff present in the complex chromium compound (1:1-complex) or the metal-free dyestuff or both dyestuffs correspond to the general Formula 1.

The 1:1-complexes serving as starting materials in this modification of the process can be prepared by the usual known methods, for example, by reacting the monoazo-dyestuff free from complex-forming metal in an acid medium with an excess of a salt of trivalent chromium, for example, chromium formate or chromium sulfate, at the boiling temperature or, if desired, at a temperature exceeding 100° C., and in the presence of a solvent such as alcohol.

The reaction of the 1:1-chromium complexes with the metal-free dyestuffs is advantageously carried out by working in an aqueous neutral to alkaline medium at the ordinary or a raised temperature.

In order, in the modified form of the process, to produce the 1:2-complexes which are especially distinguished by their good solubility, it is generally desirable to react approximately equimolecular quantities of the chromium 1:1-complex and metal-free dyestuff.

The products of the invention are new. They are complex chromium or cobalt compounds which contain two monoazo-dyestuff molecules bound in a complex such that the ratio of the number of chromium or cobalt atoms bound in complex union to the number of monoazo-dyestuff molecules is smaller than 1:1, and advantageously about 1:2, and in which the monoazo-dyestuffs present in the complex are free from sulfonic acid and carboxylic acid groups and are of the benzene-azo-naphthalene series, and at least one of which dyestuffs corresponds to the general Formula 1.

Specially valuable are the cobalt compounds of this kind, especially those which contain two monoazo-dyestuffs both of which correspond to the Formula 1, and above all those which contain two monoazo-dyestuffs of the same constitution.

The new products are soluble in water and in weakly acid aqueous media, and are indeed more soluble than the metal-free dyestuffs from which they are made. They are suitable for dyeing and printing a very wide variety of materials, above all for dyeing animal materials such as silk, leather and especially wool, but also for dyeing or printing synthetic fibers of superpolyamides or superpolyurethanes. Viscose and cellulose acetate effect threads are reserved. In contradistinction to the chromium compounds of dyestuffs containing sulfonic acid groups, with which it is preferable to dye from strongly acid, for example, sulfuric acid, baths, the new cobalt and chromium compounds of monoazo-dyestuffs free from sulfonic acid groups are suitable above all for dyeing from weakly alkaline to neutral to weakly acid, and advantageously acetic acid, baths. Wool dyeings so obtained are distinguished by their level character, good fastness to decatizing and carbonizing, good properties of wet fastness and very good fastness to light.

The following examples illustrate the invention, the parts and percentages being by weight unless otherwise stated, and the relationship of parts by weight to parts by volume being the same as that of the kilogram to the liter.

*Example 1*

18.8 parts of 2-amino-1-hydroxybenzene-4-sulfonic acid amide are suspended in 200 parts of water and 15 parts by volume of 10 N-hydrochloric acid, and diazotized at 5–10° C. with 25 parts by volume of a 4 N-solution of sodium nitrite. The diazo solution is neutralized by the addition of sodium carbonate and run into a solution, cooled to 0° C. with ice, of 22.3 parts of 6-bromo-2-hydroxynaphthalene, 4 parts of sodium hydroxide and 5.3 parts of sodium carbonate in 200 parts of water. When the coupling is finished, the dyestuff is caused to precipitate completely, and is filtered off and dried. It is a violet powder which dissolves in dilute sodium hydroxide solution with a yellow red coloration and in concentrated sulfuric acid with a bluish red coloration.

21.1 parts of the dyestuff so obtained are dissolved in 1000 parts of water at 80° C. with the addition of 4 parts of sodium hydroxide, and the solution is mixed with 50 parts of a cobalt sulfate solution having a cobalt content of 3.25 percent. After stirring for about ½ hour the metallization is complete. The resulting dyestuff solution is neutralized by the addition of acetic acid and evaporated to dryness. The dyestuff is a violet powder which dissolves in dilute sodium hydroxide solution with a bluish red coloration and in concentrated sulfuric acid with a red-violet coloration, and dyes wool either from a weakly alkaline to neutral or acetic acid bath full bordeaux red tints of good fastness to light, and of excellent fastness to washing, decatizing and carbonizing.

*Example 2*

21.1 parts of the dyestuff obtained by replacing the 2-amino-1-hydroxybenzene-4-sulfonic acid amide used in the first paragraph of Example 1 by the same quantity of the isomeric 2-amino-1-hydroxybenzene-5-sulfonic acid amide, are dissolved in 1000 parts of water at 80° C. with the addition of 4 parts of sodium hydroxide, and the whole is mixed with 50 parts of a cobalt sulfate solution having a cobalt content of 3.25 percent. After stirring for about ½ hour at 80° C. the metallization is complete. The resulting dyestuff solution is neutralized by the addition of acetic acid and evaporated to dryness. The dyestuff is a violet powder which dissolves in dilute sodium hydroxide solution with a violet coloration and in concentrated sulfuric acid with a blue-violet coloration, and dyes wool from a weakly alkaline to neutral or acetic acid bath red-violet tints of good fastness to light and excellent fastness to washing, decatizing and carbonizing.

*Example 3*

20.2 parts of 2-amino-1-hydroxybenzene-4-sulfonic acid methylamide are suspended in 200 parts of water with the addition of 20 parts by volume of 10 N-hydrochloric acid, and diazotized at 2–5° C. with 25 parts by volume of a 4 N-solution of sodium nitrite. The diazo solution is neutralized by the addition of sodium carbonate and run into a solution, cooled to 0° C. with ice, of 14.3 parts of 2-hydroxynaphthalene, 4 parts of sodium hydroxide and 5.3 parts of sodium carbonate in 200 parts of water. When the coupling is finished, the completely precipitated dyestuff is filtered off. When dry it is a violet powder which dissolves in dilute sodium hydroxide solution with an orange coloration and in concentrated sulfuric acid with a bluish red coloration.

The dyestuff is filtered off, but not dried, and then suspended in 1200 parts of water, and mixed with 140 parts of a solution of potassium-sodium chromosalicylate having a chromium content of 2.6 percent. The chroming mixture is maintained at the boil for about 5 hours. At the end of this period the chroming is finished. The chromium complex so formed is completely precipitated by the addition of sodium chloride and filtered off. When dry it is a violet powder which dissolves in dilute sodium hydroxide solution with a red-violet coloration and in concentrated sulfuric acid with a violet coloration, and dyes wool from a weakly alkaline, neutral or acetic acid bath full brown violet tints of good fastness to light and very good fastness to washing.

The above mentioned solution of sodium-potassium chromosalicylate is prepared by boiling 362 parts of an aqueous chromium sulfate solution [$Cr_2(SO_4)_3$] having a chromium content of 7.2 percent with 138 parts of salicylic acid, dissolving the resulting chromosalicylic acid by the addition of 166 parts of sodium hydroxide solution of 40 percent strength and a sufficient quantity of potassium hydroxide solution of 37 percent strength to produce an alkaline reaction to phenolphthalein, and making up the mixture to 1000 parts with water.

*Example 4*

The dyestuff obtained as described in the first paragraph of Example 3 is dissolved in 2000 parts of water with the addition of 8 parts of sodium hydroxide, the solution is heated to 70–80° C., and after the addition of 100 parts of a cobalt sulfate solution having a cobalt content of 3.25 percent, the whole is further stirred for ½ hour to 1 hour at 70–80° C. At the end of this period the metallization is complete. The dyestuff solution so obtained is neutralized with acetic acid and evaporated to dryness. The cobalt complex is a brown-violet powder which dissolves in dilute sodium hydroxide solution with a red coloration and in concentrated sulfuric acid with a violet coloration, and dyes wool from a weakly alkaline, neutral or acetic acid bath full bordeaux red tints of good fastness to light and very good fastness to washing, decatizing and carbonizing.

In the following table are given further complex chromium and cobalt compounds which can be made by the methods described in the foregoing examples. In columns I and II are given the diazo and coupling components used for making the metal-free dyestuffs, and in columns III and IV are given the tints of the dyeings obtainable on wool with the corresponding chromium and cobalt complexes, respectively.

| | I<br>Diazo-components | II<br>Coupling Components | III<br>Dyeing on wool Cr-complex | IV<br>Dyeing on wool Co-complex |
|---|---|---|---|---|
| 1 | 2-amino-1-hydroxy-benzene-5-sulfonic acid amide. | 6-bromo-2-hydroxy-naphthalene. | violettish grey | |
| 2 | ----do---- | 6-methoxy-2-hydroxy-naphthalene. | bluish grey | blue violet. |
| 3 | ----do---- | 6-methyl-2-hydroxy-naphthalene. | bluish grey violet | red violet. |
| 4 | 2-amino-1-hydroxybenzene-4-sulfonic acid isopropylamide. | 2-hydroxynaphthalene. | brownish violet | bordeaux red. |
| 5 | 2-amino-1-hydroxybenzene-4-sulfonic acid dimethylamide. | ----do---- | ----do---- | Do. |
| 6 | 2-amino-1-hydroxybenzene-4-sulfonic acid-β-hydroxyethylamide. | ----do---- | ----do---- | Do. |
| 7 | 2-amino-1-hydroxybenzene-4-sulfonic acid di (β-hydroxyethyl)-amide. | ----do---- | ----do---- | Do. |
| 8 | 2-amino-1-hydroxybenzene-4-sulfonic acid-phenylamide. | ----do---- | ----do---- | Do. |
| 9 | 2-amino-1-hydroxybenzene-4-sulfonic acid-pyrrolidide. | ----do---- | ----do---- | Do. |
| 10 | 4-chloro-2-amino-1-hydroxybenzene-5-sulfonic acid amide. | ----do---- | bluish grey violet | red violet. |
| 11 | 4-chloro-2-amino-1-hydroxybenzene-6-sulfonic acid amide. | ----do---- | grey violet | Do. |
| 12 | 6-chloro-2-amino-1-hydroxybenzene-4-sulfonic acid amide. | ----do---- | violettish grey | bordeaux. |
| 13 | 6-nitro-2-amino-1-hydroxybenzene-4-sulfonic acid amide. | ----do---- | ----do---- | brownish violet. |
| 14 | 4-methyl-2-amino-1-hydroxybenzene-5-sulfonic acid amide. | ----do---- | bluish grey violet | red-violet. |
| 15 | 2-amino-1-hydroxy-benzene-5-sulfonic acid-methylamide. | ----do---- | bluish violet | bluish bordeaux. |
| 16 | 2-amino-1-hydroxy-benzene-4-sulfonic acid amide. | 2-hydroxynaphthalene-6-sulfonic acid phenyl ester. | brown violet | bordeaux red. |
| 17 | ----do---- | 2-hydroxynaphthalene-7-sulfonic acid phenyl ester. | violet | bordeaux. |
| 18 | 4-nitro-2-amino-1-hydroxybenzene-6-sulfonic acid amide. | 2-hydroxynaphthalene. | reddish grey | violet brown. |

*Example 5*

17.85 parts of the dyestuff from diazotized 2-amino-1-hydroxybenzene-4-sulfonic acid-methylamide and β-naphthol and 20.95 parts of the dyestuff from diazotized 2-amino-1-hydroxybenzene-4-sulfonic acid-phenylamide and β-naphthol are suspended in 1500 parts of water and mixed with 142 parts of a solution of sodium chromosalicylate having a chromium content of 2.6 percent. After boiling for 6 hours under reflux the chromium is complete. The chromium compound so obtained is precipitated by the addition of sodium chloride and filtered off. When dry it is a dark powder which dissolves in water and in concentrated sulfuric acid with a violet coloration and dyes wool from a weakly alkaline, neutral or acetic acid bath full brownish violet tints.

In order to prepare the corresponding cobalt compound the above mixture of dyestuffs is dissolved with the addition of 8 parts of sodium hydroxide in 1000 parts of water at 80° C., and mixed with 100 parts of a cobalt sulfate solution having a cobalt content of 3.25 percent. After stirring for about ½ hour at 80° C. the metallization is complete. The resulting dyestuff solution is neutralized by the addition of acetic acid and evaporated to dryness. The cobalt mixed complex so obtained is, in the dry state, a brown powder which dissolves in water with a red coloration and in concentrated sulfuric acid with a violet coloration, and dyes wool from a weakly alkaline, neutral or acetic acid bath bordeaux red tints.

In the following table are given further complex metal compounds which can be made by the method described in this example. In columns I and II are given the two monoazo-dyestuffs used as starting materials. In column III is given the tint of the dyeing obtainable on wool with the chromium complex and in column IV the tint obtainable with the cobalt complex.

| | I | II | III<br>Dyeing on wool Cr-complex | IV<br>Dyeing on wool Cr-complex |
|---|---|---|---|---|
| 1 | 2-amino-1-hydroxy-benzene-4-sulfonic acid-methylamide ⟶ β-naphthol. | 6-acetylamino-4-nitro-2-amino-1-hydroxybenzene ⟶ 1-acetylamino-7-hydroxynaphthalene. | grey | |
| 2 | 2-amino-1-hydroxy-benzene-4-sulfonic acid-methylamide ⟶ β-naphthol. | 4-acetylamino-6-nitro-2-amino-1-hydroxy-benzene ⟶ 1-acetyl-amino-7-hydroxy-naphthalene. | blue grey | violet. |
| 3 | 2-amino-1-hydroxy-benzene-4-sulfonic acid-isopropyl-amide ⟶ β-naphthol. | 2-amino-1-hydroxy-benzene-4-sulfonic acid amide ⟶ 5:8-dichloro-1-hydroxynaphthalene. | violettish grey | bordeaux. |
| 4 | 2-amino-1-hydroxy-benzene-4-sulfonic acid amide ⟶ 2-hydroxynaphthalene-6-sulfonic acid phenyl ester. | 2-amino-1-hydroxy-benzene-4-sulfonic acid amide ⟶ 5:8-dichloro-1-hydroxynaphthalene | violet | Do. |
| 5 | 2-amino-1-hydroxy-benzene-4-sulfonic acid methylamide ⟶ 2-hydroxynaphthalene. | 2-amino-1-hydroxy-benzene-4-sulfonic acid isopropylamide ⟶ 2-hydroxy-naphthalene. | brownish violet | bordeaux red. |

Example 6

35.7 parts of the dyestuff obtained as described in the first paragraph of Example 3, 18.3 parts of the dyestuff from diazotized 4-nitro-2-amino-1-hydroxybenzene and 1-acetylamino-7-hydroxynaphthalene, and 18.3 parts of the dyestuff from diazotized 5-nitro-2-amino-1-hydroxybenzene and 1-acetylamino-7-hydroxynaphthalene are suspended in 3000 parts of water and mixed with 220 parts of a solution of sodium chromosalicylate having a chromium content of 2.6 per cent. After boiling the mixture for 6 hours under reflux the chroming is complete. The chromium compound so formed is precipitated by the addition of sodium chloride and filtered off. When dry it is a black powder which dissolves in water with a violet-grey coloration and in concentrated sulfuric acid with a red-violet coloration, and dyes wool grey tints from a weakly alkaline, neutral or acetic acid bath.

The corresponding cobalt compound is a powder which dissolves in water and in concentrated sulfuric acid with a red-violet coloration, and dyes wool from a weakly alkaline, neutral or acetic acid bath brownish bordeaux tints.

Example 7

0.5 part of the cobaltiferous dyestuff obtained according to Example 2 is dissolved in 4000 parts of water and 10 parts of crystalline sodium sulfate are added. 100 parts of well wetted wool are entered at 40–50° C. into the dyebath so obtained. 3 parts of acetic acid of 40 percent strength are added, the temperature of the bath raised to the boiling point in the course of half an hour, and dyeing carried on for 45 minutes at the boil. Finally, the wool is rinsed with cold water and dried. There is obtained a level red-violet dyeing of good fastness to washing, decatizing, carbonizing and light.

When in this example 100 parts of superpolyamide fibers (nylon fibers) are used instead of the wool, there is likewise obtained a red-violet dyeing.

The same result is obtained when no acetic acid is added to the dyebath.

What is claimed is:

1. A metalliferous azo-dyestuff containing one atom of a metal selected from the group consisting of chromium and cobalt bound in complex union to substantially two molecules of the same monoazo dyestuff free from sulfonic acid and carboxylic acid groups and corresponding to the formula

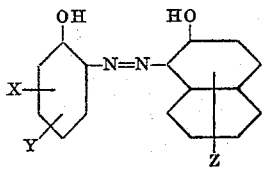

in which Y represents a sulfonic acid amide group containing a single sulfur atom, X represents a member selected from the group consisting of a nitro group, a methyl group, a chlorine atom and a hydrogen atom, and Z represents a member selected from the group consisting of a hydrogen atom, a bromine atom, a methyl group, a methoxy group and a sulfonic acid aryl ester group, at most one of the symbols X and Z being hydrogen when Y is the group —$SO_2NH_2$.

2. A complex cobalt compound containing one atom of cobalt bound in complex union to substantially two molecules of the same monazo dyestuff free from sulfonic and carboxylic acid groups and corresponding to the formula

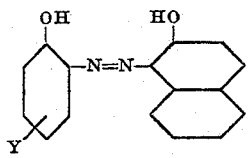

wherein Y represents a substituted sulfonic acid amide group containing a single sulfur atom.

3. A complex cobalt compound containing one atom of cobalt bound in complex union to substantially two molecules of the same monazo dyestuff free from sulfonic and carboxylic acid groups and corresponding to the formula

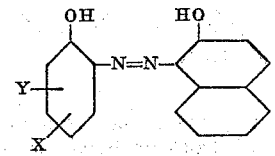

wherein X represents a halogen atom and Y a sulfonic acid amide group containing a single sulfur atom.

4. A complex cobalt compound containing one atom of cobalt bound in complex union to substantially two molecules of the same monazo dyestuff free from sulfonic and carboxylic acid groups and corresponding to the formula

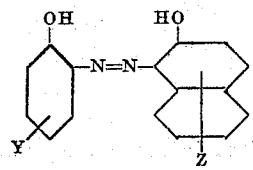

wherein Y represents a sulfonic acid amide group containing a single sulfuration and Z a halogen atom.

5. A complex chromium compound containing one atom of chromium in complex union with substantially two molecules of the same monoazo dyestuff corresponding to the formula

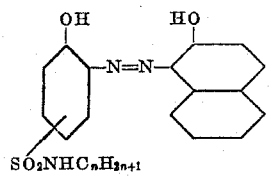

in which $n$ represents a whole number up to 4.

6. A complex cobalt compound containing one atom of cobalt in complex union with substantially two molecules of the same monoazo dyestuff corresponding to the formula

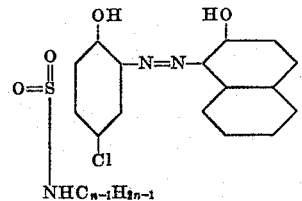

wherein $n$ represents a whole number up to 5.

7. A complex cobalt compound containing one atom of cobalt in complex union with substantially two molecules of the same monoazo dyestuff corresponding to the formula

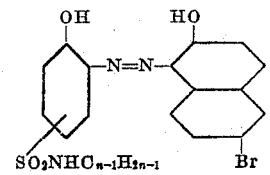

wherein $n$ represents a whole number up to 5.

8. A complex cobalt compound containing one atom of cobalt in complex union with substantially two molecules of the same monoazo dyestuff corresponding to the formula

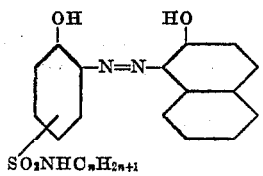

wherein $n$ represents a whole number up to 4.

9. The complex cobalt compound containing one atom of cobalt bound in complex union with substantially two molecules of the monoazo-dyestuff of the formula

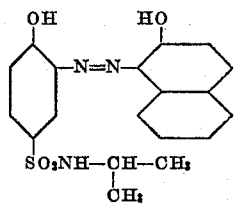

10. The complex cobalt compound containing one atom of cobalt bound in complex union with substantially two molecules of the monoazo-dyestuff of the formula

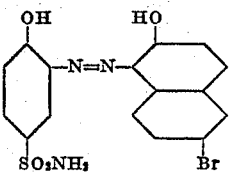

11. The complex cobalt compound containing one atom of cobalt bound in complex union with substantially two molecules of the monoazo-dyestuff of the formula

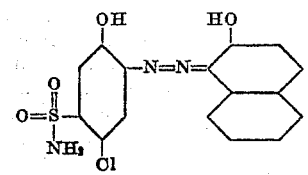

References Cited in the file of this patent
UNITED STATES PATENTS

| | | |
|---|---|---|
| 2,396,327 | Kvalnes et al. | Mar. 12, 1946 |
| 2,597,676 | Schetty | May 20, 1952 |
| 2,610,175 | Widmer et al. | Sept. 9, 1952 |
| 2,671,081 | Billings et al. | Mar. 2, 1954 |
| 2,674,515 | Widmer et al. | Apr. 6, 1954 |